US008726049B2

(12) United States Patent
Kasahara et al.

(10) Patent No.: US 8,726,049 B2
(45) Date of Patent: May 13, 2014

(54) COMPUTER SYSTEM WITH A PLURALITY OF COMPUTER MODULES AND BASEBOARD MANAGEMENT CONTROLLERS, INCLUDING A STATE MACHINE THAT DYNAMICALLY CONDUCTS A SWITCHING OPERATION

(75) Inventors: Toshiharu Kasahara, Sagamihara (JP); Yukiharu Yoshimura, Kamakura (JP); Isao Ohara, Hadano (JP); Masataka Torizawa, Hadano (JP)

(73) Assignee: Hitachi, Ltd., Tokyo (JP)

( * ) Notice: Subject to any disclaimer, the term of this patent is extended or adjusted under 35 U.S.C. 154(b) by 223 days.

(21) Appl. No.: 13/309,703

(22) Filed: Dec. 2, 2011

(65) Prior Publication Data
US 2012/0144223 A1 Jun. 7, 2012

(30) Foreign Application Priority Data

Dec. 7, 2010 (JP) ................................. 2010-272727

(51) Int. Cl.
*G06F 1/00* (2006.01)
*G06F 1/32* (2006.01)

(52) U.S. Cl.
CPC .................................. *G06F 1/3203* (2013.01)
USPC ........................................................ 713/300

(58) Field of Classification Search
CPC ................................................... G06F 1/3203
USPC ........................................................ 713/300
See application file for complete search history.

(56) References Cited

U.S. PATENT DOCUMENTS

| 8,006,108 | B2 * | 8/2011 | Brey et al. ...................... 713/320 |
| 8,082,454 | B2 * | 12/2011 | Totten ............................ 713/300 |
| 8,375,115 | B2 * | 2/2013 | Partani et al. .................. 709/223 |
| 2005/0257213 | A1 | 11/2005 | Chu et al. |
| 2009/0234936 | A1 * | 9/2009 | Bandholz et al. ............. 709/220 |
| 2009/0271654 | A1 | 10/2009 | Fukuyama et al. |
| 2010/0313072 | A1 * | 12/2010 | Suffern ........................... 714/37 |
| 2011/0040917 | A1 * | 2/2011 | Lambert et al. ............... 710/301 |

FOREIGN PATENT DOCUMENTS

| JP | 2003-022222 A | 1/2003 |
| JP | 2005-135063 A | 5/2005 |

OTHER PUBLICATIONS

European Search Report issued for the counter part EP application as of Mar. 2, 2012.
Zhilou Yu et al., "Research of IPMI Management Based on BMC SOC", Management and Service Science (MASS), 2010 International Conference on, IEEE, Piscataway, NJ, USA, Aug. 24, 2010, pp. 1-3.

(Continued)

*Primary Examiner* — Mohammed Rehman
(74) *Attorney, Agent, or Firm* — Volpe and Koenig, P.C.

(57) ABSTRACT

Without disposing any dedicated management module, it is possible to monitor sensors of shared sections shared among computer modules. A computer system includes a state machine for monitoring a power state of each computer module and a state of a baseboard management controller of the computer module, shared modules of shared sections shared among the computer modules, and switches corresponding to the shared modules for selecting one of the baseboard management controllers to establish connections between the baseboard management controllers and the shared modules. At occurrence of an abnormality in the power state or the baseboard management controller of any one of the computer modules, the state machine dynamically conducts a switching operation to designate one of the baseboard management controllers to monitor sensors of the shared modules.

3 Claims, 7 Drawing Sheets

(56) References Cited

OTHER PUBLICATIONS

Tom Slaight, "Using IPMI Platform Management in Modular Computer Systems", Feb. 18, 2003.

Intelligent Platform Management Interface Specification Second Generation, Jun. 12, 2009, p. 12-34, http://www.intel.com/design/servers/ipmi/spec.htm.

* cited by examiner

| | "A" INPUT | "B" INPUT | PREVIOUS OUTPUT | OUTPUT (COMMUNICATION LINE 1230) |
|---|---|---|---|---|
| 3010 | "A" OK | "B" OK | DESIGNATE "A" (LOW) | DESIGNATE "A" (LOW) |
| 3011 | "A" OK | "B" OK | DESIGNATE "B" (HIGH) | DESIGNATE "B" (HIGH) |
| 3012 | "A" OK | "B" NG | X | DESIGNATE "A" (LOW) |
| 3013 | "A" NG | "B" OK | X | DESIGNATE "B" (HIGH) |
| 3014 | "A" NG | "B" NG | X | DESIGNATE "A" (LOW) |

| | INPUT | | | OUTPUT | |
|---|---|---|---|---|---|
| S# | R# | CK | D# | Q | Q# |
| LOW | HIGH | X | X | HIGH | LOW |
| HIGH | LOW | X | X | LOW | HIGH |
| LOW | LOW | X | X | HIGH | HIGH |
| HIGH | HIGH | CK | LOW | LOW | HIGH |
| HIGH | HIGH | CK | HIGH | HIGH | LOW |

COMPUTER SYSTEM WITH A PLURALITY OF COMPUTER MODULES AND BASEBOARD MANAGEMENT CONTROLLERS, INCLUDING A STATE MACHINE THAT DYNAMICALLY CONDUCTS A SWITCHING OPERATION

INCORPORATION BY REFERENCE

The present application claims priority from Japanese application JP2010-272727 filed on Dec. 7, 2010, the content of which is hereby incorporated by reference into this application.

BACKGROUND OF THE INVENTION

The present invention relates to a computer system, and in particular, to a computer system including a plurality of computer modules in which shared sections to be shared among the computer modules are monitored by use of sensors.

Recently, an information processing apparatus like a server generally includes a main system to provide predetermined functions of a computer and a maintenance and management system which monitors physical integrity of constituent components of the main system, for example, a fan, a power source, a Central Processing Unit (CPU), and a memory to carry out system management, restoration or recovery, and resource management to thereby secure high reliability and maintenability. As such technique of the prior art, there is known a technique described, for example, in JP-A-2005-135063.

Also, as such conventional technique, there is known a technique described, for example, in JP-A-2003-22222. This technique relates to an information processing apparatus including a baseboard management controller including a processor as a server controller. The baseboard management controller monitors all sensors in the computer as an information processing apparatus. The standards for the baseboard management controller are described in detail in "Intelligent Platform Management Interface Specifications" of Intel Corporation, dated Jun. 12, 2009.

When the computer system including a plurality of computer modules includes no management module independent of the computer modules, it is a general practice that a baseboard management controller in a particular computer module selected from the computer modules is employed to monitor sensors of the sections shared among the computer modules.

SUMMARY OF THE INVENTION

When the conventional computer system including a plurality of computer modules includes no management module independent of the computer modules, a baseboard management controller mounted in a particular computer module is used as the baseboard management controller to monitor the sensors of the shared sections in many cases. However, if the baseboard management controller monitoring the sensors becomes inoperative due to, for example, an abnormality in this configuration, it is not possible to monitor the sensors to detect, for example, a failure. This leads to a problem in the management of the computer system.

It is therefore an object of the present invention to provide a computer system which removes the problem of the prior art and in which one of the computer modules monitors the sensors in the shared sections of the computer modules without disposing any dedicated management module.

To achieve the object according to the present invention, there is provided a computer system including a plurality of computer modules each of which includes a baseboard management controller. The computer system includes a state machine for monitoring a power state of power of each of the computer modules and a state of the baseboard management controller of the computer module, a plurality of modules of shared sections to be shared among the computer modules, and a plurality of switches corresponding to the modules of shared sections for selecting one of the baseboard management controllers and for establishing connections between the baseboard management controllers and the modules of shared sections. At occurrence of an abnormality in the power state of any one of the computer modules or in the baseboard management controller of any one of the computer modules, the state machine dynamically conducts a switching operation to designate one of the baseboard management controllers to monitor sensors of the modules of shared sections.

In accordance with the present invention, it is possible in a computer system including a plurality of computer modules that one of the computer modules monitors the sensors in the shared sections of the computer modules without disposing any dedicated management module.

Other objects, features and advantages of the invention will become apparent from the following description of the embodiments of the invention taken in conjunction with the accompanying drawings.

DESCRIPTION OF THE EMBODIMENTS

Referring now to the drawings, description will be given in detail of an embodiment of a computer system according to the present invention.

Figure 1:
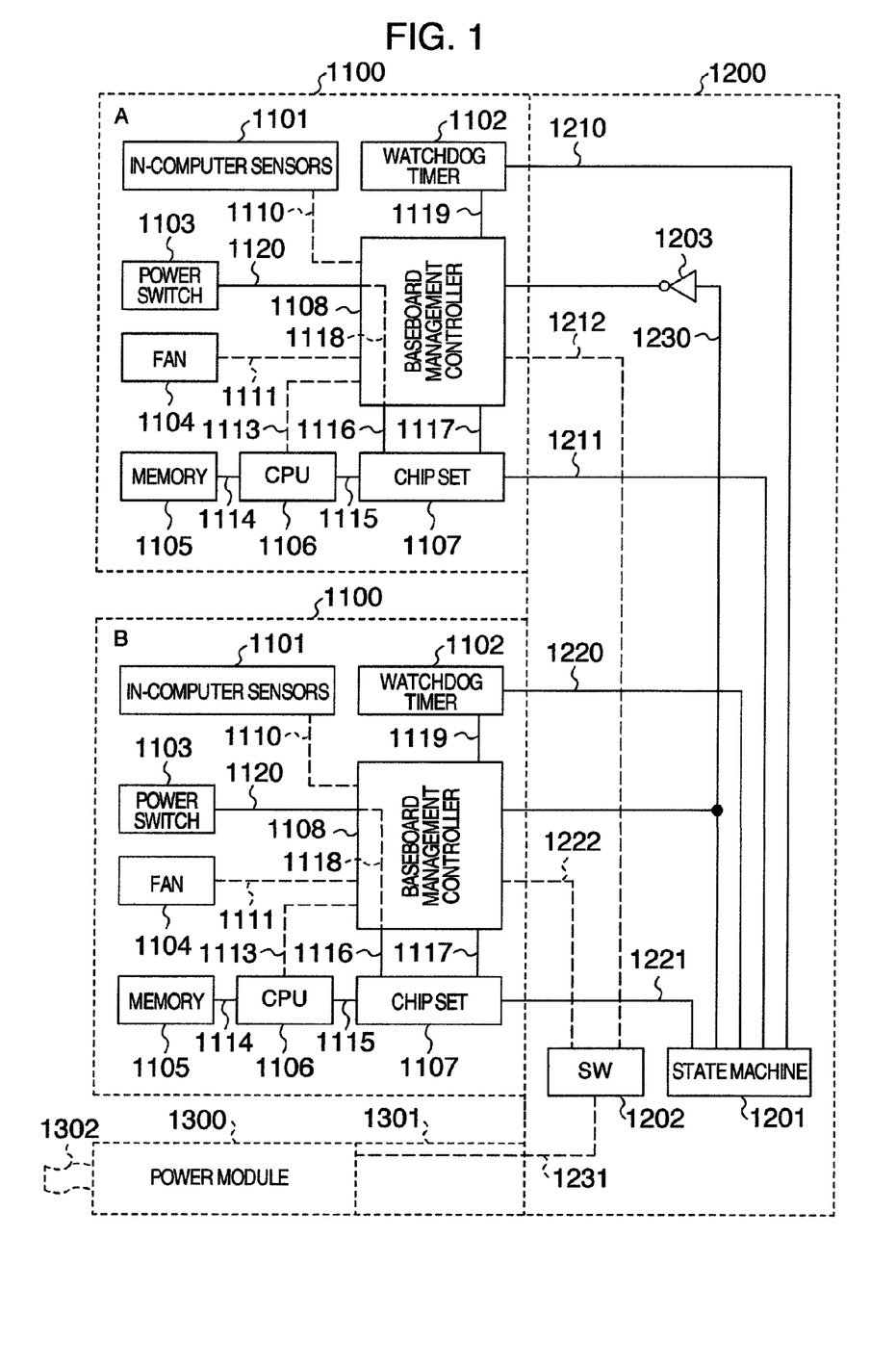
FIG. 1 is a block diagram showing a configuration example of a computer system according to an embodiment of the present invention.

FIG. 1 shows an example of structure of a computer system according to an embodiment of the present invention in a block diagram. Although the embodiment is an example of a computer system including two computer modules, the present invention is also applicable to a system configuration including more than two computer modules.

In FIG. 1, solid lines 1114 to 1117, 1119 and 1120, 1210 and 1211, 1220 and 1221, and 1230 represent signal lines. Broken lines 1110, 1111, 1113, 1212, 1222, and 1231 represent I2C connections. A dotted line 1118 indicates passing of a signal line through a constituent component.

As FIG. 1 shows, the computer system according to the embodiment includes two computer modules 1100 (the upper module will be referred to as "A" and the lower module will be referred to as "B" according to necessity hereinbelow), a common baseboard 1200, a power module 1300, and a power module baseboard 1301.

Each computer module 1100 includes a CPU 1106, a memory 1105, a chip set 1107, a computer module cooling fan 1104, a power switch 1103 to turn power on and off, a baseboard management controller 1108, sensors 1101 in the computer, and a watchdog timer 1102. The CPU 1106, the memory 1105, the chip set 1107, the fan 1104, and the power switch 1103 provide functions for operations of a computer. The baseboard management controller 1108 includes, in addition to these constituent components for the computer functions, constituent components to provide a function (to be referred to as a sensor monitor function hereinbelow) to monitor physical integrity of sensors in each computer module 1100. The baseboard management controller 1108 performs the sensor monitor operation at a predetermined interval of time. This operation will be called sensor monitor polling.

The CPU 1106 is an arithmetic processing unit coupled via the I2C connection 1113 with the baseboard management controller 1108. The baseboard management controller 1108 monitors an output of a temperature state of the CPU 1106 by use of the sensor monitor polling function. The CPU 1106 is also coupled via the bus 1114 with the memory 1105 to conduct an operation to monitor an abnormality of the memory 1105 in addition to the operation as a computer. Further, the CPU 1106 is linked via the bus 1115 with the chip set 1107 and is hence capable of notifying an abnormality of the memory 1105 via the chip set 1107 to the baseboard management controller 1108.

The chip set 1107 is coupled via the signal line 1117 with the baseboard management controller 1108 and hence can notify an abnormality of the memory 1105 detected by the CPU 1106 to the controller 1108. Also, the chip set 1107 is coupled via the signal line 1116 with the baseboard management controller 1108. Hence, the controller 1108 can send a power control signal via the signal line 1116 to the chip set 1107.

In addition, when the power of the computer module 1100 is on, the chip set 1107 outputs a signal "LOW" to the signal line 1211 or 1221. When the power of the computer module 1100 is off, the chip set 1107 outputs a signal "HIGH" to the signal line 1211 or 1221.

The fan 1104 is linked via the I2C connection 1111 with the baseboard management controller 1108. The controller 1108 conducts the sensor monitor polling to monitor the number of rotations of the fan 1104.

The power switch 1103 is coupled via the signal lines 1120, 1118, and 1116 with the chip set 1107 and is capable of sending a power control signal to the chip set 1107. The signal line 1118 passes the baseboard management controller 1108. Hence, by monitoring the signal line 1118, the controller 1108 can detect an event of depression of the power switch.

Each of the computer modules 1100 includes the CPU 1106, the memory 1105, the chip set 1107, and the power switch 1103. Hence, the computer modules 1100 are independent of each other in the power state.

The sensors in computer 1101 of each computer module 1100 include a voltage sensor, a temperature sensor, and a fuse sensor which are arranged at associated sections in the computer module 1100. All sensors are connected via the I2C connection 1110 to the baseboard management controller 1108.

As described above, the baseboard management controller 1108 is linked with the constituent components for the computer functions and the sensors in computer 1101. The controller 1108 monitors the sensors by conducting the sensor monitor polling.

Either one of the baseboard management controllers 1108 respectively of the computer modules "A" and "B" monitors the sensors of the power module 1300 shared between the computer modules "A" or "B". The state machine 1201 disposed on the common baseboard 1200 designates which one of the controllers 1108 of the computer modules "A" and "B" is to monitor the sensors. The designation method will be described later.

The watchdog timer 1102 monitors integrity of the baseboard management controller 1108 via the signal line 1119 and outputs the result of the monitoring operation to the signal line 1210 or 1220. The configuration and operation of the watchdog timer 1102 will be described later.

The common baseboard 1200 includes the state machine 1201 and the switch 1202. The state machine 1201 is connected via the signal lines 1210 and 1220 to the outputs from the watchdog timers 1102 respectively of the computer modules "A" and "B" to monitor integrity of the baseboard management controllers 1108 of "A" and "B".

Also, the state machine 1201 is coupled via the signal lines 1211 and 1221 with the outputs from the chip sets 1107 respectively of the computer modules 1100 "A" and "B", the outputs respectively indicating the power states of the respective modules "A" and "B". The state machine 1201 monitors the power states of the modules "A" and "B" via the signal lines 1211 and 1221.

Further, the state machine 1201 is linked via the signal line 1230 with the baseboard management controllers 1108 of the computer modules "A" and "B". By use of the output to the signal line 1230, the state machine 1201 can designate the module "A" or "B" to monitor the sensors of the power module 1300 as the shared section.

Since an NOT circuit 1203 is arranged on the side of the computer module "A" of the signal line 1230, the input on the signal line 1230 from the module "A" to the baseboard management controller 1108 has a signal value reverse to that of the input on the signal line 1230 from the module "B" to the controller 1108 in any situation. As a result, the state machine 1201 is capable of designating either one of the baseboard management controllers 1108.

The switch 1202 is coupled via the I2C connections 1212 and 1222 with the baseboard management controllers 1108 of the computer modules "A" and "B" and establishes the I2C connection 1212 or 1222. When the controller 1108 of the module "A" turns the signal line 1212 on, the switch 1202 changes the connection to the signal line 1212. Reversely, when the controller 1108 of the module "B" turns the signal line 1222 on, the switch 1202 changes the connection to the signal line 1222.

Also, the switch 1202 is coupled via the I2C connection 1231 with the power module 1300. Hence, the baseboard management controller 1108 of the computer module "A" or "B" can detect an abnormality of any sensor of the power module 1300 by conducting the sensor monitor polling.

In the computer system of the embodiment shown in FIG. 1, only the power module 1300 is indicated as an example of the shared section or unit shared between the computer modules "A" and "B". However, it is also possible to dispose as shared sections, for example, a fan and a large-capacity storage. Any section sharable between the computer modules "A" and "B" can be monitored by the baseboard management controller 1108 of the computer module "A" or "B" in the method according to the present invention. In a situation in which a plurality of sections are arranged as shared sections as above, it is solely necessary that switches 1202 are disposed for the respective shared sections such that each section is connected via the associated switch 1202 to the baseboard management controllers 1108 respectively of the computer modules "A" and "B".

Figure 2:
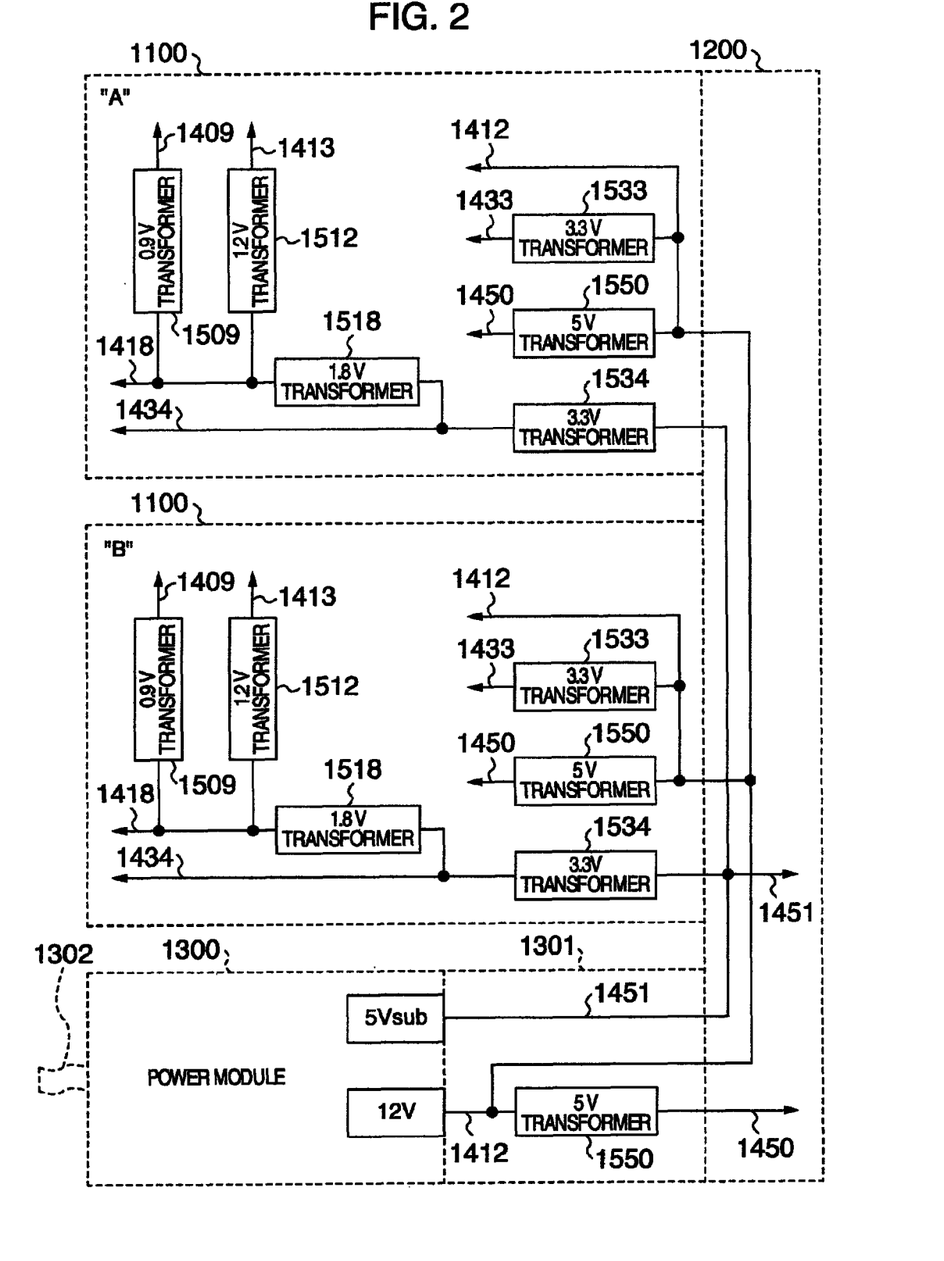
FIG. 2 is a diagram for explaining supply of power in the computer system according to the embodiment.

FIG. 2 shows supply of power in the computer system according to the embodiment. Referring to FIG. 2, description will be given of how to supply power in the computer system.

The computer module 1100 includes no power source and is hence provided with power from the power module 1300. The power module 1300 provides an output voltage of 5 V on a 5V sub-output 1451 and an output voltage of 12 V on a 12V sub-output 1412.

The 5 V output voltage on the 5V sub-output 1451 is an output capable of supplying power in any situation when the power module 1300 is connected to the power cable 1302 and AC power is supplied thereto. This output voltage is the power source for the baseboard management controllers 1108 and the like and is also supplied to the state machine 1201 on the common baseboard 1200. The 12 V output voltage on the 12V sub-output 1412 is supplied only when the power state (state of the power switch) of the baseboard management controller 1108 of the computer module "A" or "B" is turned on. This output voltage is employed for the computer module 1100 to serve the computer functions.

It is not possible to operate all constituent components of the computer system by the output voltage of 5 V on the 5V sub-output 1451 and the output voltage of 12 V on the 12V sub-output 1412. Each of the output voltages on the 5V sub-output 1451 and the 12V sub-output 1412 is converted by a transformer including a DC-DC converter into a desired voltage.

A transformer 1550 converts the 12 V output voltage on the 12V sub-output 1412 into an output voltage of 5 V on a 5V sub-output 1450. The transformer 1550 is separately disposed in each computer module 1100 and the power module baseboard 1301 to reduce the number of connections between the common baseboard 1200 and the computer modules 1100.

A transformer 1534 converts the 5 V output voltage on the 5V sub-output 1451 into an output voltage of 3.3 V on a 3.3V sub-output 1434. The 3.3 V output voltage on the 3.3V sub-output 1434 is supplied to the chip set 1107.

A transformer 1533 converts the 12 V output voltage on the 12V sub-output 1412 into an output voltage of 3.3 V on a 3.3V sub-output 1433, which is supplied to the CPU 1106 and the like.

A transformer 1518 converts an output voltage of 3.3 V on a 3.3V sub-output 1434 into an output voltage of 1.8 V on a 1.8V sub-output 1418, which is supplied to the baseboard management controller 1108 and the like.

A transformer 1512 converts the output voltage of 1.8 V on the 1.8V sub-out 1418 into an output voltage of 1.2 V on a 1.2V sub-output 1413, which is supplied to the baseboard management controller 1108.

A transformer 1509 converts the output voltage of 1.8 V on the 1.8V sub-out 1418 into an output voltage of 0.9 V on a 0.9V sub-output 1409, which is supplied to the memory 1105.

When the power cable 1302 is connected to the AC power, the power module 1300 provides the 5 V output voltage on the 5V sub-output 1451 to the computer modules "A" and "B". Hence, in each computer module, it is possible to supply the 3.3 V output voltage on the 3.3V sub-output 1434, the 1.8 V output voltage on the 1.8V sub-output 1418, the 1.2 V output voltage on the 1.2V sub-output 1413, and the 0.9 V output voltage on the 0.9V sub-output 1409.

When the power state of the computer module 1100 is set to on, the power module 1100 is provided with the 12 V output voltage on the 12V sub-output 1412, the 5 V output voltage on the 5V sub-output 1450, and the 3.3 V output voltage on the 3.3V sub-output 1433 in addition to the output voltages supplied when the power module 1300 is connected to the power cable 1302.

Figure 3:
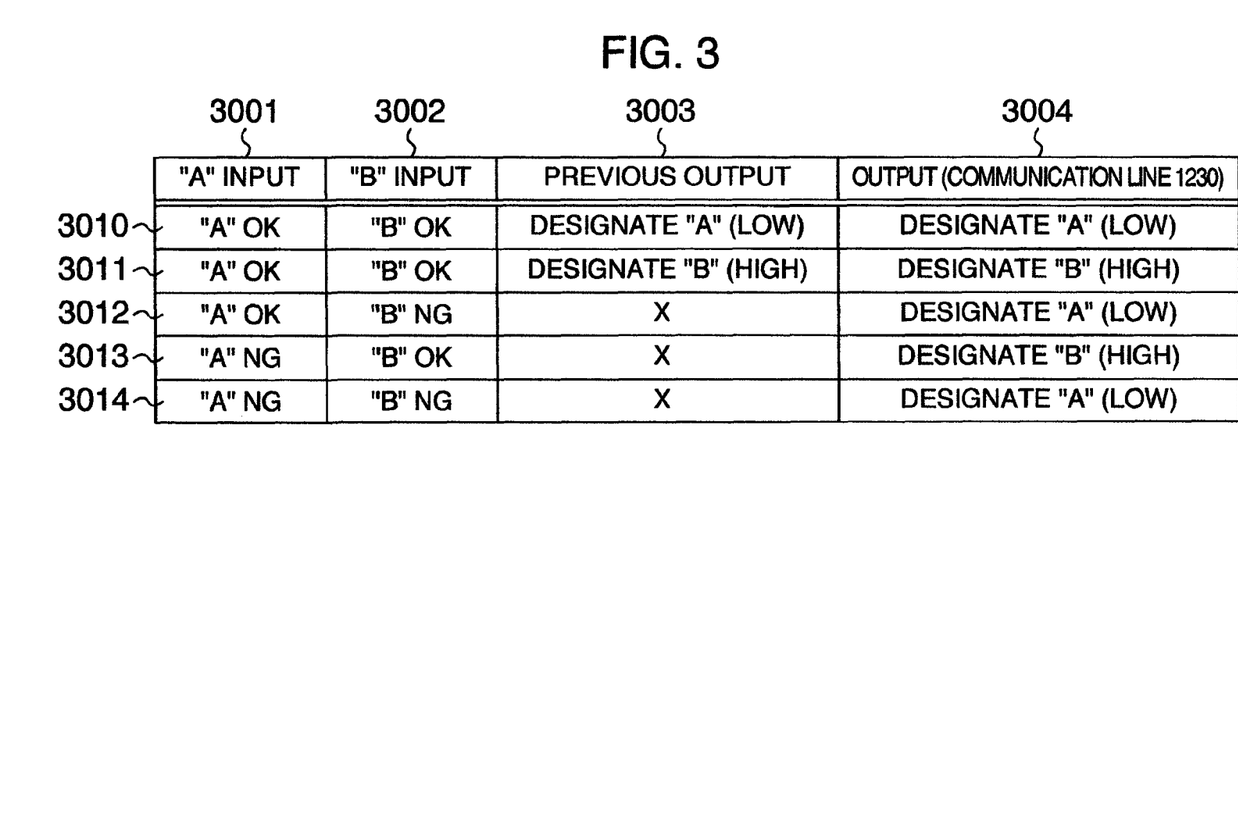
FIG. 3 is a state transition table for explaining operations of a state machine.

FIG. 3 shows a state transition table for explaining operations in the state machine 1201. Referring now to FIG. 3, description will be given of an operation in which the state machine 1201 designates the baseboard management controller 1108 of the computer module "A" or "B" for the sensor monitoring operation. The state machine 1201 operates according to the state transition table shown in FIG. 3.

The state transition table of FIG. 3 includes a plurality of records 3010 to 3014. Each record includes an "A" input 3001, a "B" input 3002, a previous output 3003, and an output 3004 from the state machine 1201 at change in the input of the computer module "A" or "B".

In FIG. 3, "A" OK indicates that the baseboard management controller 1108 of the computer module "A" is operating in a normal state (LOW on the signal line 1210) and the power state of the computer module "A" is on (LOW on the signal line 1211). Further, "A" NG represents a state other than the state indicated by "A" OK.

In addition, "B" OK indicates that the baseboard management controller 1108 of the computer module "B" is operating in a normal state (LOW on the signal line 1220) and the power state of the computer module "B" is on (LOW on the signal line 1221). Further, "B" NG indicates a state other than the state associated with "B" OK.

The "A" input 3001 from the computer module "A" takes a value of "A" OK or "A" NG. The "B" input 3002 from the computer module "B" takes a value of "B" OK or "B" NG.

The previous output 3003 indicates the value of HIGH or LOW being outputted from the state machine 1201 to the output 3004 (communication line 1230) when the "A" input 3001 from the computer module "A" or the "B" input 3002 from the computer module "B" is changed.

The record 3010 of the state transition table indicates that when the input 3001 from the computer module "A" is "A" OK, the input 3002 from the computer module "B" is "B" OK, and the previous output 3003 designates the computer module "A" (LOW on the signal line 1230), the output 3004 from the state machine 1201 designates the computer module "A" (LOW on the signal line 1230).

The record 3011 indicates that when the input 3001 from the computer module "A" is "A" OK, the input 3002 from the computer module "B" is "B" OK, and the previous output 3003 designates the computer module "B" (HIGH on the signal line 1230), the output 3004 from the state machine 1201 designates the computer module "B" (HIGH on the signal line 1230).

The record 3012 indicates that when the input 3001 from the computer module "A" is "A" OK and the input 3002 from the computer module "B" is "B" NG the output 3004 from the state machine 1201 designates the computer module "A" (LOW on the signal line 1230) regardless of the previous output 3003 (X in FIG. 3).

The record 3013 indicates that when the input 3001 from the computer module "A" is "A" NG and the input 3002 from the computer module "B" is "B" OK, the output 3004 from the state machine 1201 designates the computer module "B" (HIGH on the signal line 1230) regardless of the previous output 3003 (X in FIG. 3).

The record 3014 indicates that when the input 3001 from the computer module "A" is "A" NG and the input 3002 from the computer module "B" is "B" NG the output 3004 from the state machine 1201 designates the computer module "A" (LOW on the signal line 1230) regardless of the previous output 3003 (X in FIG. 3).

Figure 4:
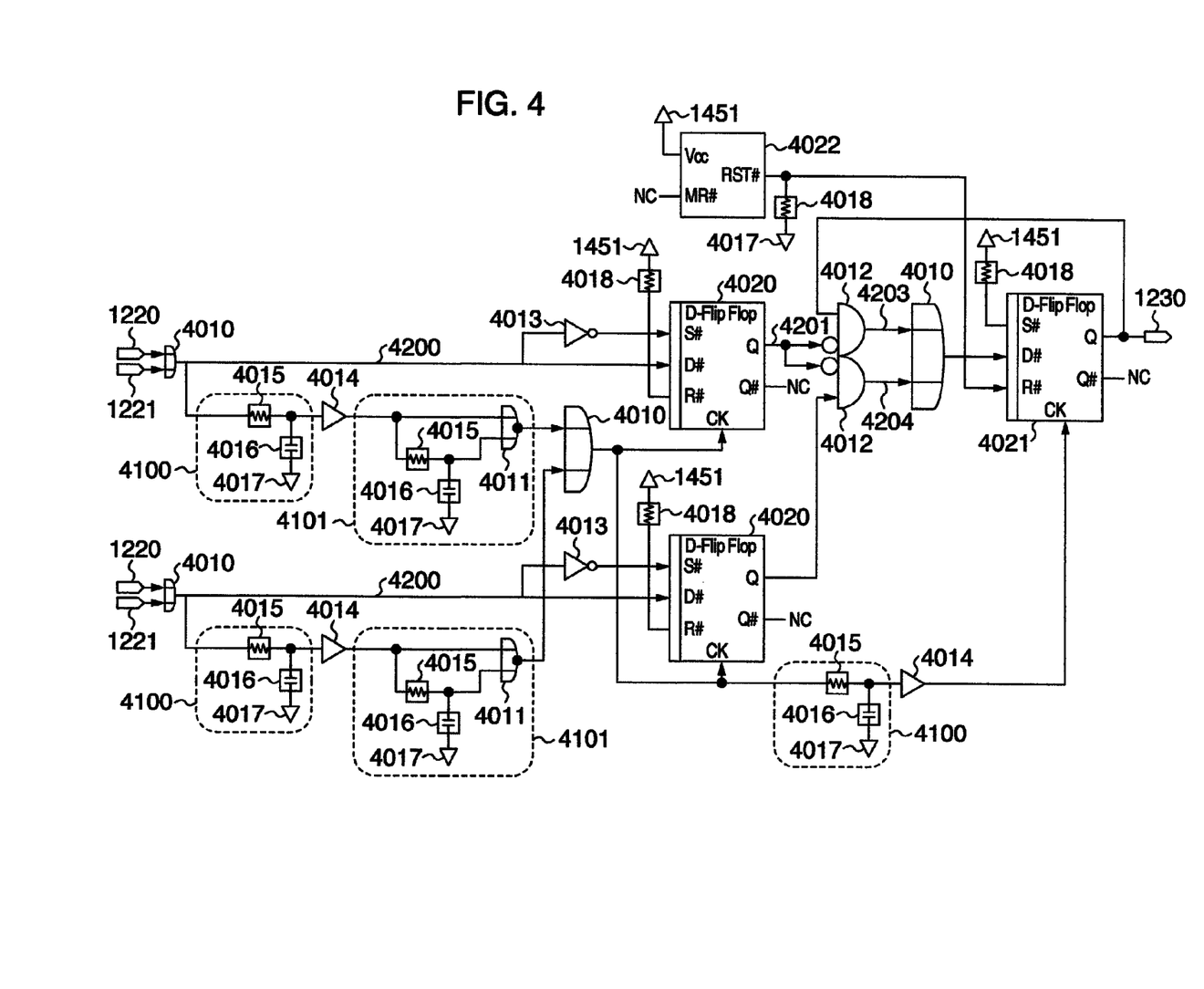
FIG. 4 is a block diagram showing a hardware configuration of the state machine.
Figure 7:
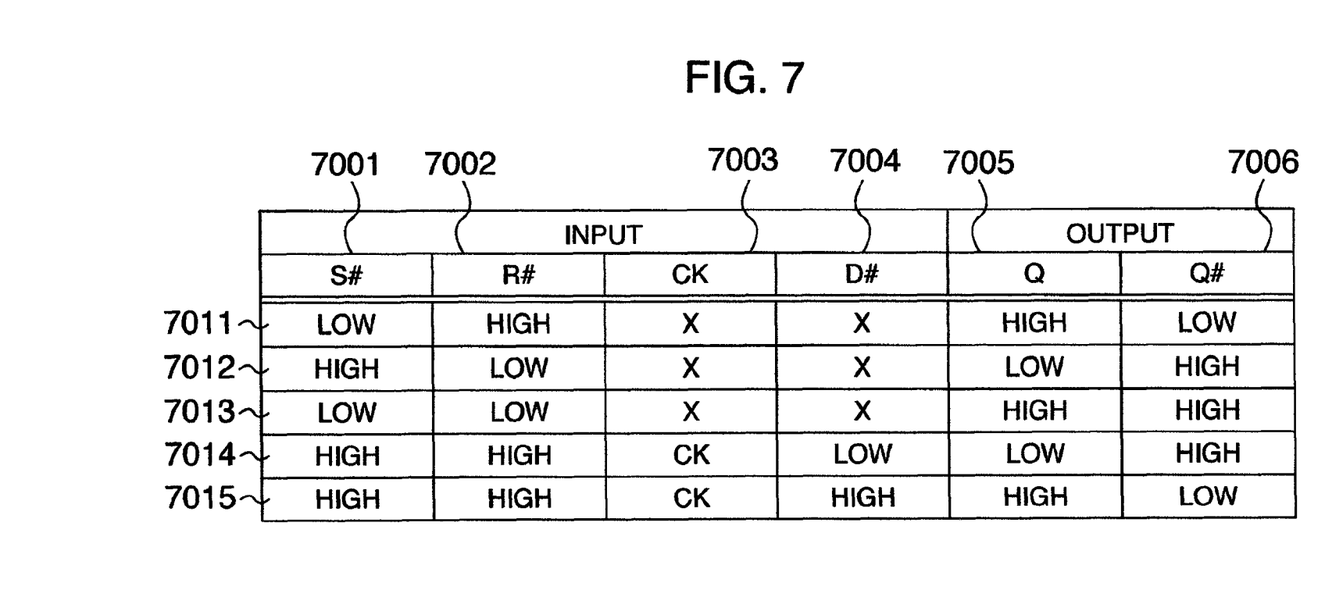
FIG. 7 is a truth table for a D flip flop element.

FIG. 4 shows a hardware configuration of the state machine 1201 in a block diagram and FIG. 7 is a truth table for a D flip flop element. Referring now to FIGS. 4 and 7, description will be given of an internal configuration of the state machine 1201.

In FIG. 4, flip flop elements 4020 and 4021 are asynchronous flip flop elements of positive edge trigger type. Inputs to each of the flip flop elements 4020 and 4021 include S# (set input 7001), R# (reset input 7002), CK (clock input 7003), and D# (delay input 7004). Outputs from each of the flip flop elements include Q7005 and Q#7006.

Referring to the truth table shown in FIG. 7, description will be given of operations of the flip flop elements 4020 and 4021. The truth table includes records 7011 to 7015 representing combinations of inputs and outputs. The record 7011 indicates that when the input S# is LOW and the input R# is HIGH, the output Q is HIGH and the output Q# is LOW regardless of the values respectively of the input CK and the input D# (X in FIG. 7).

The record 7012 indicates that when the input S# is HIGH and the input R# is LOW, the output Q is LOW and the output Q# is HIGH regardless of the values respectively of the input CK and the input D# (X in FIG. 7).

The record 7013 indicates that when the input S# is LOW and the input R# is LOW, the output Q is HIGH and the output Q# is HIGH regardless of the values respectively of the input CK and the input D# (X in FIG. 7). The record 7014 indicates that when the input S# is HIGH, the input R# is HIGH, and the input D# is LOW, the output Q is set to LOW and the output Q# is set to HIGH if a pulse changing from LOW to HIGH is supplied to the input CK (this event will be simply referred to as a pulse input according to necessity hereinbelow).

The record 7015 indicates that when the input S# is HIGH, the input R# is HIGH, and the input D# is HIGH, the output Q is set to HIGH and the output Q# is set to LOW if the pulse is supplied to the input CK.

Returning now to FIG. 4, description will be given of the hardware configuration of the state machine 1201.

The state machine 1201 is connected to the signal line 1210 indicating whether or not the baseboard management controller 1108 of the computer module "A" is normal, the signal line 1211 indicating the power state of the computer module "A", the signal line 1220 indicating whether or not the baseboard management controller 1108 of the computer module "B" is normal, and the signal line 1221 indicating the power state of the computer module "B". Based on the values of these signal lines, the state machine 1201 produces output values according to the state transition table shown in FIG. 3 to designate which one of the baseboard management controllers 1108 of the computer module "A" and "B" monitors the sensors of the power module 1300.

The state machine 1201 mainly includes three D flip flop elements 4020, 4020, and 4021, an initializer circuit 4022, three delay circuits 4100, and two pulse generator circuits 4101. These constituent components are mutually connected to each other as shown in FIG. 4.

Next, description will be given of initialization of the state machine 1201 configured as above.

When the power module 1300 is connected to the power cable 1302 and is provided with AC power, the 5 V output voltage on the 5V sub-output 1451 is applied via a resistor of ten kiloohm (kΩ) 4018 to the input R# of each D flip flop element 4020 of positive edge trigger type. Since the initial value of the input to the input S# of the D flip flop element 4020 is LOW, the output Q is set to an initial value, i.e., HIGH according to the record 7011 of the truth table shown in FIG. 7.

Also, the 5 V output voltage on the 5V sub-output 1451 is applied via a 10 kΩ resistor 4018 to the input S# of the D flip flop element 4021 of positive edge trigger type. Since the initial value of the input R# of the D flip flop element 4021 is LOW, the output Q is set to an initial value of HIGH according to the state indicated by the record 7012 of the truth table.

Thereafter, in an initial state of a short period of time until the 5 V output voltage on the 5V sub-output 1451 rises up to approximately 5 V, the initializer 4022 is outputting a signal of LOW. When the 5 V output voltage reaches approximately 5 V, the RST# output is set to HIGH and is applied to the input R# of the D flip flop element 4021. As a result, the D flip flop element 4021 is driven by applying a pulse to the input CK as described in conjunction with the state of the record 7014 or 7014.

As described above, the inputs to the state machine 1201 are supplied via the signal line 1210 (indicating whether or not the baseboard management controller 1108 of "A" is normal), the signal line 1211 (indicating the power state of "A"), the signal line 1220 (indicating whether or not the baseboard management controller 1108 of "B" is normal), and the signal line 1221 (indicating the power state of "B").

Signals on the signal lines 1210 and 1211 are supplied to an OR circuit 4010 to set a signal line 4200 to LOW only in the state of "A" OK. Likewise, signals on the signal lines 1220 and 1221 are supplied to the OR circuit 4010 to set the signal line to LOW only in the state of "B" OK. The delay circuit 4100 includes a 1 kΩ resistor 4015, a capacitor of 0.01 microfarad (μF) 4016, and ground potential (GND) 4017 to produce a delay time of ten microseconds (μs). The delay circuit 4100 delivers an output signal to a buffer 4014, which regulates the current before the pulse generator 4101.

The pulse generator 4101 includes a 1 kΩ resistor 4015, a 0.01 μF capacitor 4016, GND 4017, and an XOR circuit 4011 to produce a 10 μs pulse signal. The pulse generator 4101 applies the pulse signal to the input CK of the respective D flip flop elements 4020 and 4021 to drive the elements.

Due to the OR circuit 4010 in the preceding stage of the pulse generator 4101, the D flip flop element 4020 is driven when the state of the signal on one of the signal lines 1210, 1211, 1220, and 1221 is changed. The signal obtained at change in the state of the signal is applied via the delay circuit 4100 of 10 μs delay to the D flip flop element 4021 to drive the element 4021.

In the D flip flop element 4020, a signal of HIGH is delivered to the input R# and a signal of LOW is fed to the input D# in the state of "A" OK or "B" OK (the signal line 4200 is LOW). Further, since the signal on the signal line 4200 is supplied via the NOT circuit 4013 to the input S#, HIGH is delivered to the input S#. Hence, when the pulse is inputted to the input CK, the output Q is set to LOW according to the state indicated by the record 7014 of the truth table shown in FIG. 7.

Also, in the D flip flop element 4020, the input R# is set to HIGH in the state of "A" NG or "B" NG (the signal line 4200 is HIGH). Further, since the signal on the signal line 4200 is supplied via the NOT circuit 4013 to the input the input S# is set to LOW. Hence, the output Q is set to HIGH according to the state indicated by the record 7011 of the truth table.

The outputs Q from the D flip flop elements 4020 are fed respectively to output lines 4201 and 4202 as shown in FIG. 4. A signal obtained by reversing the signal on the output line 4201 and the output Q from the D flip flop element 4021 are fed to an AND circuit 4012. The AND circuit 4012 outputs a resultant signal to a signal line 4203. The signal obtained by reversing the signal on the output line 4201 and the signal on the signal line 4202 are supplied to an AND circuit 4012. The AND circuit 4012 outputs a resultant signal a signal line 4204. Also, the signal on the signal line 4203 and the signal on the signal line 4204 are fed to the OR circuit 4010. The OR circuit 4010 outputs a resultant signal to the input D# of the D flip flop element 4021. As described above, the inputs S# and R# are HIGH. When the pulse is applied to the input CK, the D flip flop element 4021 directly delivers the signal on the input D# to the signal line 1230.

As above, the state machine 1201 operates according to the state transition table shown in FIG. 3. Even when the state of the computer module "A" or "B" is indefinite, the state machine 1201 outputs HIGH or LOW to the signal line 1230 to designate either one of the computer modules "A" and "B" in any situation.

Returning to FIG. 1, the baseboard management controller 1108 continuously monitors the input signal from the signal line 1230. When the signal line 1230 is HIGH (the signal is reversed by the NOT circuit 1203 for "A"), the controller 1108 recognizes that the controller 1108 is designated to monitor the sensors of the power module 1300 as the shared section.

The baseboard management controller 1108 to monitor the sensors of the power module 1300 changes the connection of the switch 1202 to the own side via the I2C connection 1212 or 1222. The controller 1108 starts polling to monitor the sensors of the power module 1300 via the I2C connection 1212 or 1222, the switch 1202, and the I2C connection 1231.

Conversely, when the signal line 1230 is set to LOW (the signal is reversed by the NOT circuit 1203 for "A"), the baseboard management controller 1108 assumes that the controller 1108 is not designated to conduct the sensor monitor polling for the sensors of the power module 1300 and then stops the sensor monitor polling.

The state machine 1201 does not directly change the connection of the switch 1202 for the following reason. At occurrence of a failure in one of the baseboard management controllers 1108, if the switch 1202 is held in an inappropriate state, it is not possible for the state machine 1201 to change the connection of the switch 1202. Hence, in the embodiment of the present invention, when establishing connection to the power module 1300, the baseboard management controller 1108 changes the connection of the switch 1202 by itself.

Figure 5:
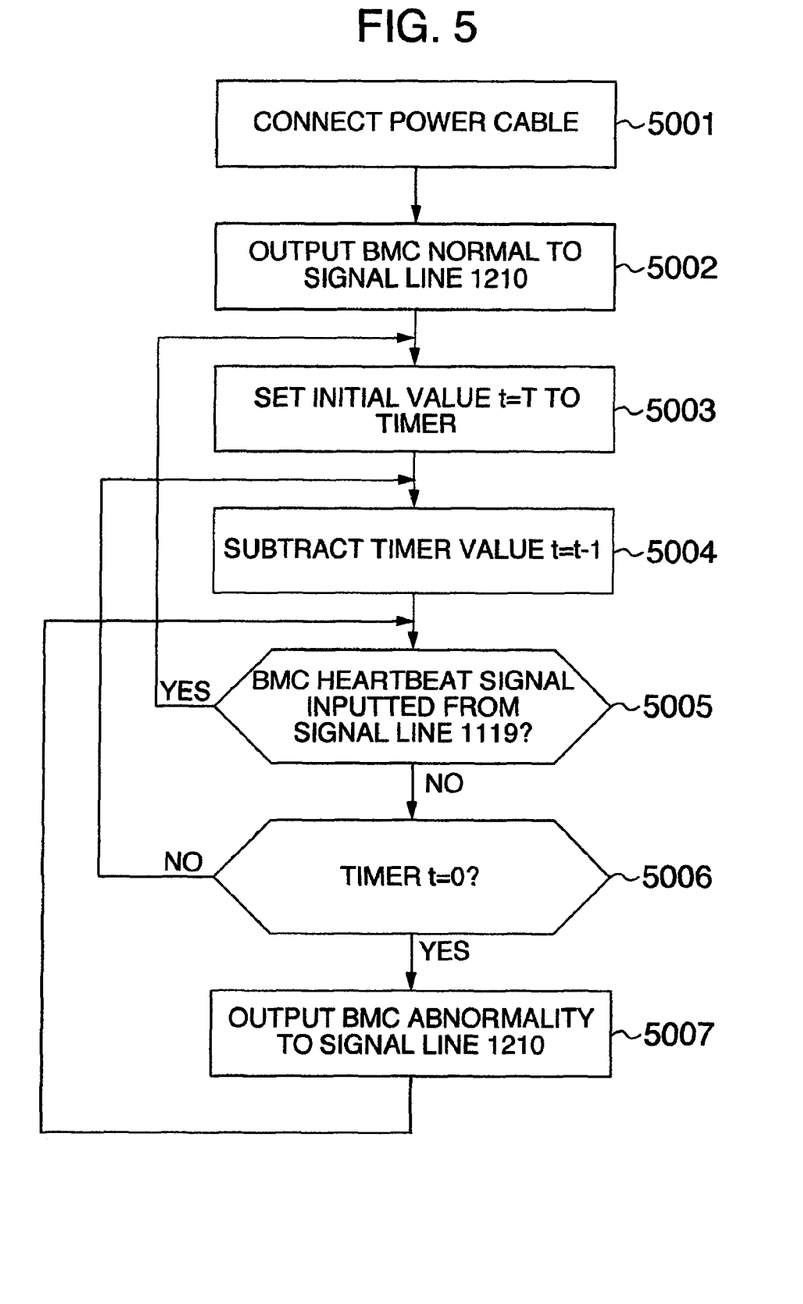
FIG. 5 is a flowchart showing operations of a watchdog timer of a computer module "A"

FIG. 5 shows operations of the watchdog timer 1102 of the computer module "A" in a flowchart. Referring now to the flowchart, description will be given of operations of the watchdog timer 1102. The watchdog timer 1102 monitors whether or not a heartbeat signal to be outputted from the baseboard management controller 1108 at an interval of time (to be represented as Tbmc hereinbelow) is being normally outputted, to thereby monitor integrity or normality of the controller 1108.

When the power module 1300 is connected via the power cable 1302 to AC power, the watchdog timer 1102 executes initialization, specifically, outputs an initial value of LOW to the signal line 1210 to indicate normality of the baseboard management controller 1108 to the state machine 1201 (steps 5001 and 5002).

The watchdog timer 1102 sets an initial value T to a timer t. The initial value T is more than the interval of time Tbmc of the heartbeat signal outputted from the baseboard management controller 1108. It is then started to subtract a predetermined value from the value set to the timer t (steps 5003 and 5004).

The watchdog timer 1102 judges to determine whether or not the heartbeat signal has been received via the signal line 1119 from the baseboard management controller 1108. If it is detected that the heartbeat signal has been received, the watchdog timer 1102 returns to step 5003 to repeat the processing in which the timer value is set to the timer and then the predetermined value is subtracted from the timer value (step 5005).

If it is detected that the heartbeat signal has not been received, the watchdog timer 1102 makes a check to determine whether or not the value of the timer t is zero. If the value is other than zero, the watchdog timer 1102 returns to step 5004 to continue the processing in which the predetermined value is subtracted from the timer value (step 5006).

If the value of the timer t is zero as a result of the processing in step 5006, it is assumed that a time-out has taken place. The watchdog timer 1102 outputs a signal of HIGH to the signal line 1210 to indicate an abnormality of the baseboard management controller 1108 to the state machine 1201. The watchdog timer 1102 then returns to step 5005 to repeatedly execute the processing. By continuously monitoring the signal line 1119, the watchdog timer 1102 waits for occurrence of a state in which the baseboard management controller 1108 returns to the normal state (step 5007).

The watchdog timer 1102 of the computer module "B" operates almost in the same way. The watchdog timer 1102 outputs a signal indicating whether or not the baseboard management controller 1108 is normal to the signal line 1220.

Figure 6:
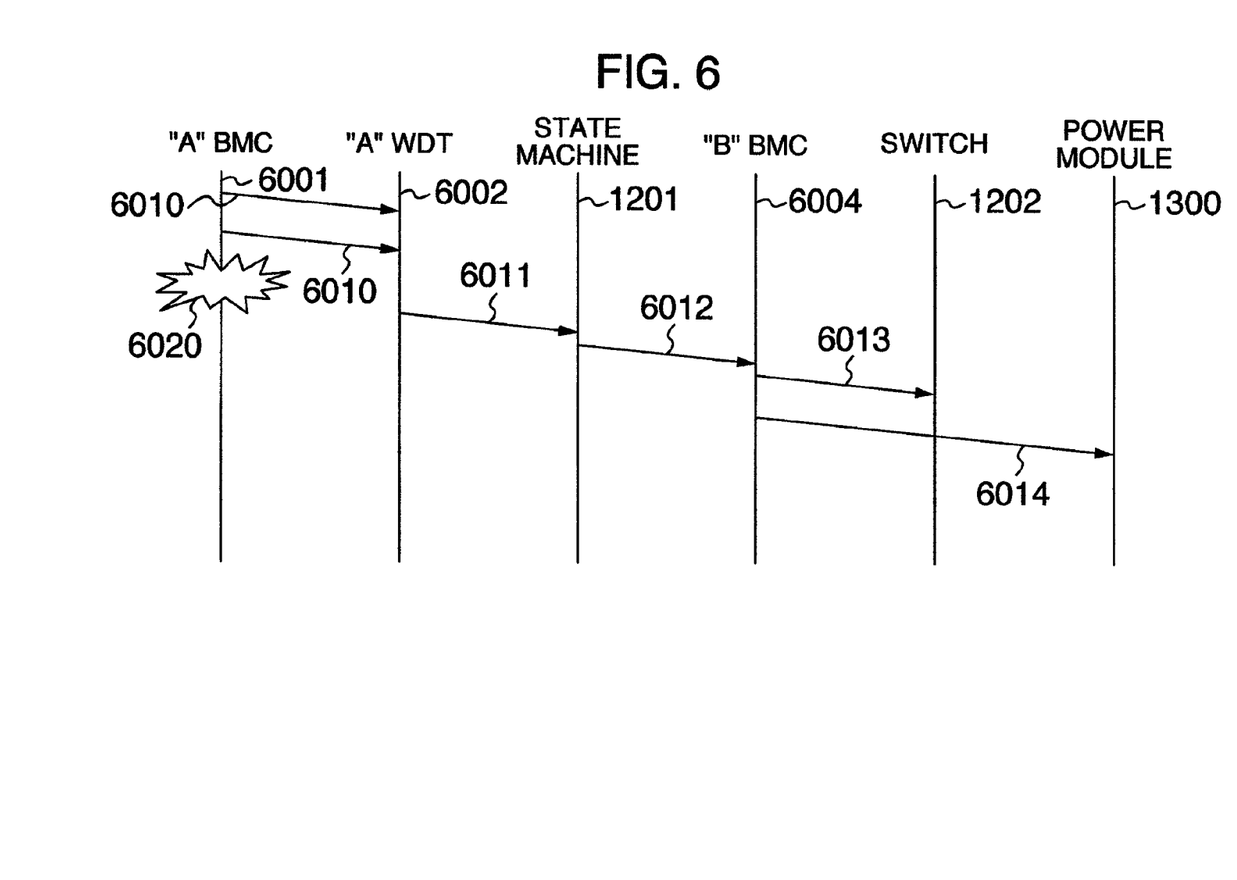
FIG. 6 is a sequence chart for explaining an operation example of the computer system when a baseboard management controller of the computer module "A" is abnormal.

FIG. 6 shows a sequence chart for explaining an operation example of the computer system when the baseboard management controller 1108 of "A" is abnormal. Description will now be given of the operation by referring to the sequence chart.

During the operation in which the baseboard management controller 1108 of the computer module "A" is transmitting the heartbeat signal via the signal line 1119 to the watchdog timer 1102 of "A" at a predetermined interval of time, if a failure occurs, it is not possible for the controller 1108 to send the heartbeat signal to the watchdog timer 1102 (steps 6010 and 6020).

The watchdog timer 1102 of "A" cannot receive the heartbeat signal from the baseboard management controller 1108 for a predetermined period of time. Hence, the timer 1102 sets the signal line 1210 to HIGH to notify the state machine 1201 of the abnormality of the controller 1108 (step 6011).

Since the signal line 1210 is set to HIGH, the state machine 1201 sets the signal line 1230 to HIGH to designate that the baseboard management controller 1108 of the computer module "B" monitors the sensors of the power module 1300 (step 6012).

When the notification is received from the signal line 1230, the baseboard management controller 1108 of "B" changes the connection of the switch 1202 to the own side to start polling to monitor the sensors of the power module 1300 (steps 6013 and 6014).

According to the embodiment of the present invention, when an abnormality is detected in the power state of the computer module 1100 or in the baseboard management controller 1108, it is possible to change the baseboard management controller 1108 to monitor the sensors of the power module 1300 as the shared section.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A computer system comprising a plurality of computer modules each of which comprising a baseboard management controller, comprising:
   a state machine for monitoring a power state of power of each of the computer modules and a state of the baseboard management controller of the computer module;
   a plurality of modules of shared sections to be shared among the computer modules; and
   a plurality of switches corresponding to the modules of shared sections for selecting one of the baseboard management controllers and for establishing connections between the baseboard management controllers and the modules of shared sections, wherein
   at occurrence of an abnormality in the power state of any one of the computer modules or in the baseboard management controller of any one of the computer modules, the state machine comprising a hardware circuit dynamically conducts a switching operation to designate one of the baseboard management controllers without any intelligent management module independent of computer modules which select and switch baseboard management controllers to monitor sensors of the modules of shared sections.

2. A computer system according to claim 1, further comprising a watchdog timer for monitoring output of a pulse signal which the baseboard management controller outputs at a predetermined interval of time in a normal operation state, wherein
   the watchdog timer assumes, at detection of an event in which the pulse signal is not received from the baseboard management controller for a predetermined period of time, an abnormality of the baseboard management controller and then notifies the abnormality to the state machine.

3. A computer system according to claim 1, wherein:
   the state machine receives, as inputs thereto, the power states of the respective computer modules and the states of the baseboard management controllers of the respective computer modules; and
   even when the inputs includes indefinite inputs, the state machine designates one of the baseboard management controllers to monitor the sensors.

* * * * *